United States Patent [19]

Harwood et al.

[11] Patent Number: 4,696,349

[45] Date of Patent: Sep. 29, 1987

[54] FARM IMPLEMENT WITH FRAME CONNECTED THERETO BY LINKAGE MECHANISM

[75] Inventors: J. Richard Harwood, Innerkip; Frank A. Bell, Hamilton, both of Canada

[73] Assignee: J. I. Case Company, Racine, Wis.

[21] Appl. No.: 824,413

[22] Filed: Jan. 31, 1986

[51] Int. Cl.[4] .................. A01B 63/11; A01B 63/22
[52] U.S. Cl. ................... 172/323; 172/413; 172/443; 172/483; 172/680; 280/405 B
[58] Field of Search .............. 172/322, 323, 327, 328, 172/396, 413, 443, 457, 458, 464, 473, 483, 484, 491, 494, 680, 47, 78, 397, 439, 451, 474, 668, 675; 280/405 R, 405 A, 405 B, 408, 414.5, 446 R, 446 A, 406 R, 407, 461 R, 461 A; 111/7, 52, 55, 59, 66, 67, 69, 73

[56] References Cited

U.S. PATENT DOCUMENTS

| | | | |
|---|---|---|---|
| 1,464,130 | 8/1923 | Ferguson | 172/443 |
| 2,593,176 | 4/1952 | Patterson | 172/680 |
| 2,785,614 | 3/1957 | Jensen | 172/443 |
| 3,101,791 | 8/1963 | Van Londersele | 111/67 X |
| 3,295,612 | 1/1967 | Mayo et al. | 172/464 |
| 3,494,427 | 2/1970 | Greig et al. | 172/316 |
| 3,527,308 | 9/1970 | Bernotas et al. | 172/484 X |
| 3,545,033 | 12/1970 | Couser | 16/163 |
| 3,701,327 | 10/1972 | Krumholz | 111/81 |
| 3,724,108 | 4/1973 | Clayton | 37/193 |
| 3,742,877 | 7/1973 | Coffee | 111/6 |
| 3,744,441 | 7/1973 | Smith et al. | 111/1 |
| 3,749,035 | 7/1973 | Cayton et al. | 111/85 |
| 3,923,206 | 12/1975 | Gillies et al. | 222/371 |
| 4,057,111 | 11/1977 | van der Lely et al. | 172/72 |
| 4,103,443 | 8/1978 | Pelsy | 37/193 |
| 4,108,089 | 8/1978 | van der Lely | 111/7 |
| 4,191,262 | 3/1980 | Sylvester | 172/459 |
| 4,211,175 | 7/1980 | van der Lely | 111/6 |
| 4,231,305 | 11/1980 | van der Lely | 111/7 |
| 4,263,858 | 4/1981 | Dreyer | 111/73 |
| 4,285,284 | 8/1981 | van der Lely | 111/85 |
| 4,311,104 | 1/1982 | Steilen et al. | 111/85 |
| 4,338,871 | 7/1982 | van der Lely | 111/10 |
| 4,344,374 | 8/1982 | Gangluff et al. | 111/2 |
| 4,417,530 | 11/1983 | Kopecky | 111/73 |
| 4,424,868 | 1/1984 | Staniforth et al. | 280/405 B X |
| 4,539,921 | 9/1985 | Morlock | 111/52 |

FOREIGN PATENT DOCUMENTS 1204945 11/1965 Fed. Rep. of Germany ... 280/405 B

*Primary Examiner*—Richard T. Stouffer
*Attorney, Agent, or Firm*—Dressler, Goldsmith, Shore, Sutker & Milnamow, Ltd.

[57] ABSTRACT

An implement-mounting linkage mechanism for pivotally connecting a frame to a wheeled implement is disclosed. The mechanism is preferably used for pivotally connecting a wheeled load-bearing frame to the backside of a wheeled farm implement. The frame includes wheels adjustable relative to the frame for raising and lowering the frame relative to the ground. The frame preferably includes a plurality of soil-engaging ground-tool implements mounted thereon. The mounting-linkage mechanism of the present invention incorporates a novel non-parallel four-point design which virtually eliminates negative hitch weight when the frame is raised above the ground, in the static case. On the other hand, the novel design results in a net downward force being imposed upon the ground-tool implements when the frame is lowered for soil engagement, in the dynamic case.

4 Claims, 5 Drawing Figures

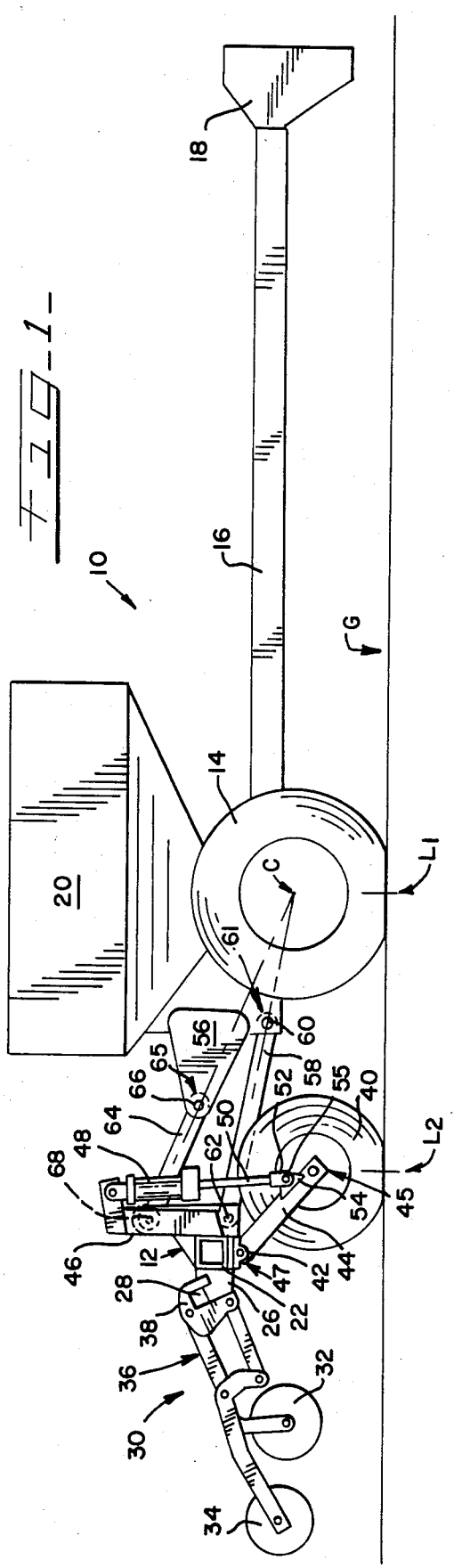
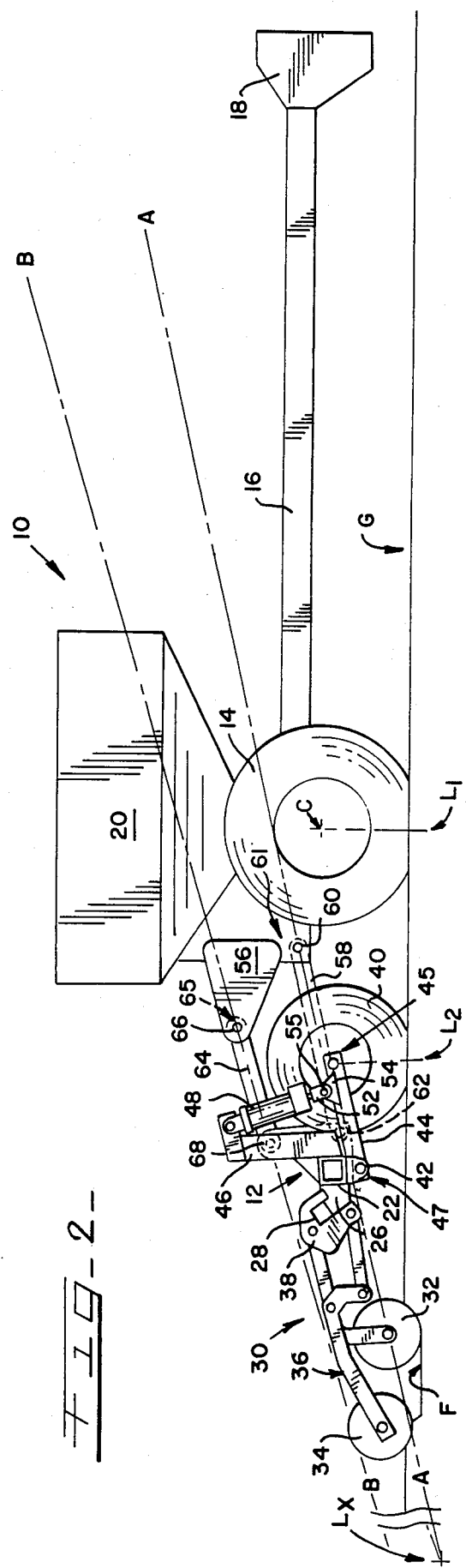

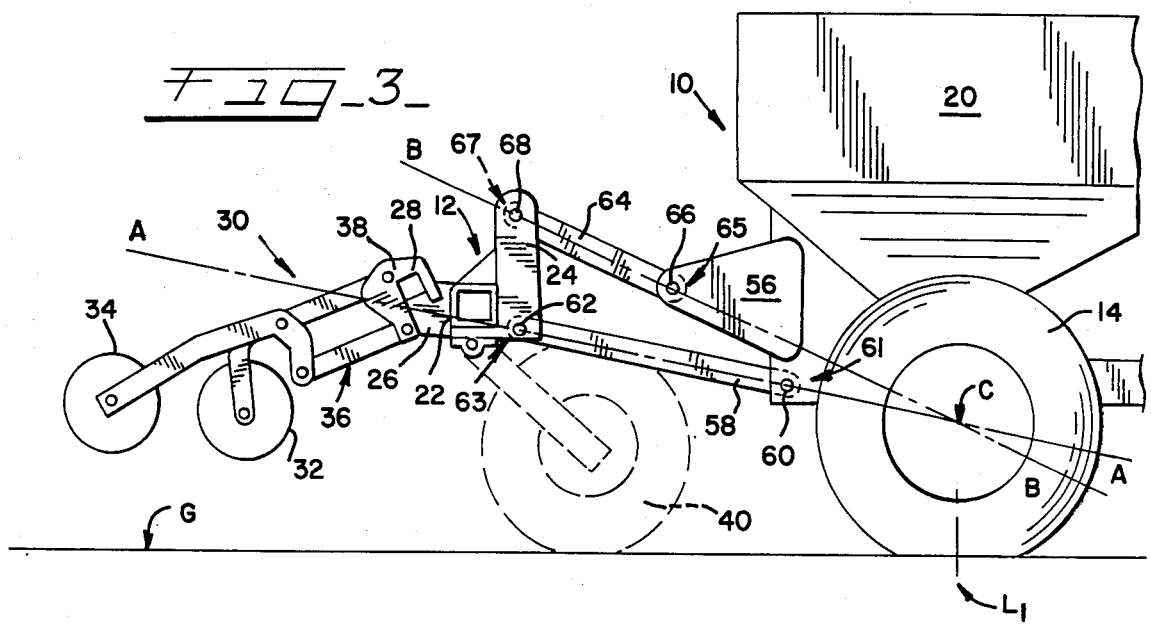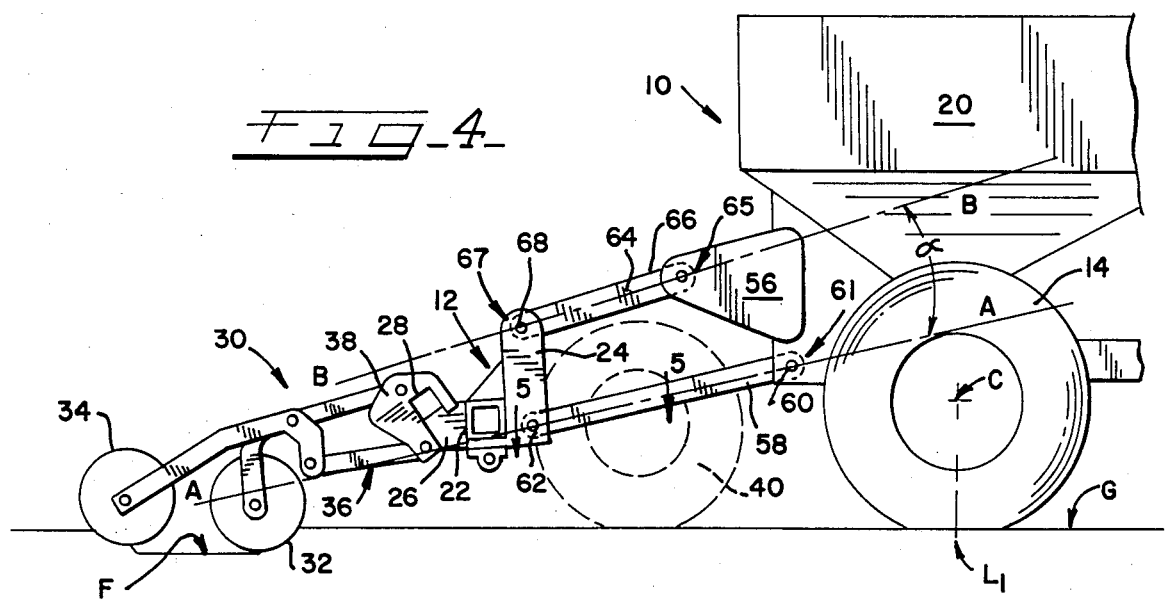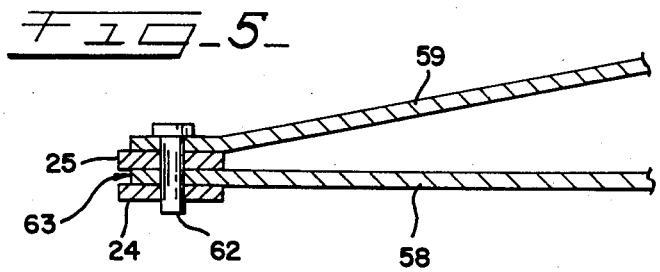

FARM IMPLEMENT WITH FRAME CONNECTED THERETO BY LINKAGE MECHANISM

TECHNICAL FIELD OF THE INVENTION

A number of conventional tractor-drawn wheeled farm implements have frames along the trailing ends thereof for mounting a plurality of soil-working ground-tool implements thereon.

The present invention is directed to a linkage mechanism for mounting a frame onto a wheeled farm implement. More particularly, the implement-mounting mechanism of the present invention, which includes several novel structural elements, has four pivot points in the linkage assembly structure thereof for raising and lowering the frame-mounted soil-working implements relative to the ground. The linkage assembly of the present invention incorporates a novel four-point-hitch non-parallel linkage design which causes the soil-working implements to be forced into the ground when lowered, and which causes overhung loads to be centered substantially on the wheels of the tractor-drawn farm implement when the soil-working implements are raised.

BACKGROUND OF THE INVENTION

A wheeled farm implement is typically connected to a tractor by a hitch which is fixed to the wheeled farm implement. One such type of wheeled farm implement can be a seed hopper or so-called "cart" for containing and supplying seeds to an air-seeder distribution system.

Such a wheeled seed-hopper implement conventionally has mounted, onto the backside thereof, an elongated frame onto which a plurality of soil-engaging ground-tool implements can be mounted. Conventional frames of this type can possess a length dimension which may be as much as two to three times as long as the distance between the seed-hopper implement wheels. Frames of this type are pulled behind the seed-hopper implement, and are generally disposed parallel to the axle connecting the centers of the seed-hopper implement wheels. Typically, the plurality of ground-tool implements are mounted on the frame, along the entire length thereof, at suitably spaced locations, and are disposed away from the wheeled farm implement. For example, when the ground-tool implement is a disc-opener and press-wheel assembly, i.e. a so-called "row unit", conventional frames may typically carry about 40-56 row units of this sort, spaced at suitable intervals along the entire length of the frame.

Conventional wheeled farm implements further generally include means for lowering and raising the frame, relative to the ground, for respectively bringing the ground tools into engagement with the ground and for raising the ground tools above the ground for transport. Such transport includes transport through the field from one work area to another, and transport to return the wheeled implement to the barn or suitable storage site. When the ground-tool implement is the disc-opener and press-wheel assembly mentioned above, it is desirable that the lowering of the frame toward the ground, into the so-called "working position", cause the disc and press wheel to come into predetermined engagement with the soil. That is, it is desirable that the disc-opener open the soil, thereby forming a seed-implanting furrow, so that the press wheel can subsequently cover a seed implanted in the furrow with moist soil. Such soil engagement by the row unit necessitates predetermined soil penetration by the disc-opener. Conventional implement-mounting linkage mechanisms do not provide for uniform soil penetration of disc-openers across the length of the ground-tool implement frame.

For example, one conventional method for mounting the frame carrying these ground-tool implements onto the wheeled implement, mentioned above, contemplates using a four-point-hitch parallel-linkage design. When the ground-tool implement is the disc and press wheel assembly (i.e., row unit) mentioned above and when the ground-tool implement frame carries a plurality of row-unit assemblies, for example, the upwardly-acting resistive soil forces (when the frame is lowered to the working position and the wheeled implement pulled across the field by a tractor) can result in each disc-opener penetrating the ground less than the desired depth, or at times can even result in the failure of certain discs to penetrate the ground at all. Because four-point-hitch parallel-linked frames of this sort are connected to wheeled implements, of the type mentioned above, by pivoted members, frames of this sort necessarily include separate wheels mounted thereon for supporting the weight of the frame and the weight of the ground-tool implements (also mounted thereon). The conventional parallel-linked four-point-hitch manner of mounting such wheeled ground-tool frames to the above-mentioned other wheeled farm implement, however, results in there being a moment imposed about the wheeled farm implement axle, due to the overhung load of the row units in relation to the frame onto which the row units are mounted. The imposition of such a moment might be unacceptable to a tractor operator. For example, such a moment can be great enough to cause the tractor-end of the hitch to be lifted off the ground, when the hitch is disconnected from the tractor, resulting in what is known as "negative hitch weight", which is totally unacceptable to most tractor operators.

Because seed-weight is often balanced in a wheeled seed-hopper farm implement of the type mentioned above, seed-weight has virtually no effect in counteracting such a moment. However, seed weight in the wheeled seed hopper does assist in forcing the soil-engaging ground-tool implements into the soil in the dynamic case, as can be determined by performing structural analysis upon the links of the conventional four-point-hitch parallel-link design. However, when the above-mentioned air-seeder distribution system causes the wheeled hopper to become depleted of its seed supply, the seed-assisting force being imposed upon the individual row units is correspondingly diminished.

Thus, conventional four-point-hitch designs cannot reduce or solve the above-discussed problems. Adding counter-balancing weight to counteract the above-discussed moment or to assist in forcing the soil-engaging ground tools into the ground, is not the answer, however, because addition of weight only tends to reduce the tractor operator's acreage-yield to fuel-consumption ratio, as more fuel is required to transport the extra weight through the field. For obvious reasons, this too is unacceptable.

SUMMARY OF THE INVENTION

The implement mounting linkage mechanism of the present invention comprises non-parallel spaced links pivotally connecting the wheeled farm implement to the frame onto which the soil-engaging ground-tool implements can be mounted. The mechanism includes a non-parallel spaced linking-member assembly respectively pivotally connecting the left-rear and right-rear corner portions of the wheeled implement to selected positions along the frame. Each assembly includes an upper linking member having pivot means at opposite end portions thereof for pivotally connecting the frame to the wheeled implement. Each assembly further includes a lower linking member similarly having pivot means at opposite end portions thereof for providing a pivoted connection between the frame and the wheeled implement. Preferably, one of the assemblies includes a pair of lower linking members, the second one of which is disposed acutely of its associated above-mentioned lower linking member. The associated pair of lower linking members, of the one assembly, co-act to retain the frame behind the wheeled implement in a predetermined fashion regardless of whether lateral forces are being imposed upon the frame or not. The pivot means located at the spaced end portions of the upper and lower linking members, respectively, define upper and lower linking member axes, which axes are non-parallel spaced relative to each other. The frame includes wheels coupled thereto, and means for raising the frame (relative to the ground) to the "transport" position and for lowering the frame to the "working" position. When the frame is raised to the transport position, the above-defined axes converge substantially along the axle of the wheeled farm implement. The result is that virtually no moment is imposed upon the wheeled implement axle in the static case. When the frame is lowered to the working position, the above-defined axes converge rearwardly of the frame-mounted soil-engaging ground tools in relation to the wheeled farm implement. In the dynamic case, this results in the imposition of a downward force upon the soil-engaging ground tools.

BRIEF DESCRIPTION OF THE DRAWINGS

FIG. 1 is a side view of a wheeled farm implement and a ground-tool-supporting frame pivotally connected rearwardly thereof, incorporating the principles of the implement-mounting linkage mechanism of the present invention, the frame shown in the "raised" or "transport" position;

FIG. 2 is the side view of FIG. 1, the frame shown as lowered to the "working" position;

FIG. 3 is a partially-fragmented and cut-away version of the "transport"-position view of FIG. 1, illustrating a preferred embodiment of the mechanism of the present invention;

FIG. 4 is the partially-fragmented and cut-away version of FIG. 3 illustrating the "working"-position; and FIG. 5 is a fragmented plan view taken along the plane 5—5 in FIG. 4, on an enlarged scale relative to FIG. 4.

DESCRIPTION OF THE PREFERRED EMBODIMENT

While the present invention is susceptible to embodiment in various forms, there is shown in the drawings and hereinafter described in detail a presently preferred embodiment of the invention, with the understanding that the present disclosure is to be considered as an exemplification of the invention without limitation to the specific embodiment illustrated.

Referring now initially to FIG. 1 there is shown a wheeled farm implement 10 having a frame 12 pivotally connected rearwardly thereof. The frame 12 is shown as raised above the ground G, into the so-called "transport position". The weight of the farm implement 10 is carried by a pair of spaced implement wheels 14 mounted therebeneath. The points of contact of the implement wheels 14 with the ground G lie along a first $L_1$ (FIGS. 1–4). The centers C of the farm-implement wheels 14 lie along a farm-implement axle (not shown), onto which the farm implement 10 is mounted. An elongated hitch bar 16 is fixed, at a first end portion thereof, to the farm implement 10 adjacent the axle. The hitch bar 16 includes a tractor hitch 18 or "tongue", fixed to the end of the bar 16 opposite the implement 10, for hitching the farm implement 10 to a tractor (not shown). The farm implement or so-called "cart" 10 further includes a hopper portion 20 which can be filled with seeds for supplying an air-seeder distribution system, as mentioned above.

Reference is next invited to FIGS. 3 and 4, which show that the frame or tool bar 12 comprises an elongated, hollow primary tool bar 22. The primary tool bar 22 is generally disposed rearwardly of the farm implement 10, and generally parallel to the backside thereof and parallel to the ground G. Mounted onto the primary tool bar 22 are parallel-spaced link-mounting plates 24 and 25 (FIG. 5), disposed generally upwardly and in the direction of the implement or cart 10, for pivotally connecting the frame 12 to the implement 10 in accordance with the principles of the present invention. Briefly, the right-rear corner portion of the implement 10 (shown in the foreground in FIG. 4) respectively includes an inner plate 25 and an outer plate 24 (FIG. 5) pivotally connected thereto, as does the left-rear corner portion of implement 10 (detail is in the background in FIG. 4, and thus not shown). This feature of the present invention will be described in greater detail below.

Also mounted onto the primary tool bar 22 are brackets 26 disposed rearwardly of the tool bar 22 relative to the implement 10. Mounted onto the brackets 26, generally rearwardly of the primary tool bar 22 relative to the farm implement 10, is a secondary tool bar 28. A suitable number of brackets 26 are mounted onto the primary tool bar 22 for supporting the weight of the secondary tool bar 28 and ground-tool implements mounted on bar 28. The secondary tool bar 28 is elongated, and is disposed generally parallel to the backside of the farm implement 10 and parallel to the ground G, for mounting a plurality of ground-tool implements thereon. One such implement is the disc-opener and press-wheel assembly 30 shown in FIGS. 1–4.

Each disc-opener and press-wheel assembly 30 comprises an individual disc-opener 32 for forming a furrow F (FIGS. 2 and 4) in the ground G when the frame 12 is lowered to the working position (FIG. 2). Each assembly 30 includes means for engaging the soil and means for working the soil, as will be described immediately hereinbelow. Each disc-opener and press-wheel assembly 30 further includes an individual press wheel 34 for pressing soil over a seed (not shown), after the seed has been deposited in the furrow F by the above-mentioned air-seeder distribution system (also not shown). That is, the disc 32 opens the soil thereby forming a furrow; and the press-wheel 34 closes the soil thus planting the seed. Each assembly 30 still further includes suitable structure 36 for spacing each disc 32 and press wheel 34 a predetermined distance relative to the ground G for forming a furrow F and for pressing soil, as above described. Each assembly structure 36 also includes a jaw portion 38 for removably mounting the plurality of assemblies 30 onto the secondary tool bar 28 at desired points along the length thereof.

A pair of spaced frame wheels 40, pivotally connected to the frame 12, carry the weight of the frame 12 on the ground G. The wheels 40 also carry the weight of the disc-opener and press-wheel assemblies 30 mounted on the frame 12. The points of contact of the frame wheels 40 with the ground G lie along a second line $L_2$ (FIGS. 1 and 2). Mounted to the underside of the primary tool bar 22, at suitably-spaced points, is a pair of mounts 42. Each such mount 42 pivotally connects a respective one of a pair of wheel arms 44 (FIGS. 1 and 2) to the tool bar 22. Each frame wheel 40 has a first end portion 45 of its associated wheel arm 44 pivotally connected to such wheel 40 at the center thereof. The second or opposite end portion 47 of each such wheel arm 44 is pivotally connected to a respective one of the two mounts 42.

Means for raising and lowering the frame 12 relative to the ground G will now briefly be discussed. Mounted on the primary tool bar 22, in the foreground relative to the link plates 24 and 25 (FIG. 1), is an upstanding cylinder tower 46. A like tower 46 is mounted in the background on the primary tool bar 22 (i.e. outwardly of the background plates 24 and 25 mentioned above). A double-acting hydraulic cylinder 48 is pivotally connected to each tower 46. "Double-acting" means that the hydraulic cylinder 48 is powered in both directions, i.e. rod extension and retraction, via pressurized hydraulic fluid. Thus the function of the hydraulic cylinders 48, each having an associated cylinder tower 46, is for raising and lowering the frame 12, using the frame wheels 40 to do so. To thus cause raising or lowering of the frame 12, each hydraulic cylinder 48 includes an associated cylinder rod 50 (FIG. 1) which can be extended to raise the frame 12 above the ground G (FIGS. 1 and 3) or retracted to lower the frame 12 and the above-mentioned soil-working round-tool implements to the working position (FIGS. 2 and 4). To effect the raising and lowering of the frame 12, as described above, the distal or so-called "free" end of each cylinder rod 50 includes a respective clevis 52 which is pivotally connected to a respective associated wheel-arm 44, preferably adjacent the wheel-arm first-end portion 45, as shown in FIGS. 1 and 2. Mounted on each wheel arm 44, preferably adjacent the center of a respective associated frame wheel 40, is a mounting bracket 54 having a through bore (not shown) for receiving a pivot pin 55. The forked ends of the clevis 52 straddle the bracket 54 and are pivotally connected thereto by the pivot pin 55. Pin 55 thus pins the clevis-end of each hydraulic cylinder 48 to its respective associated wheel arm 44.

Structure on the farm implement 10 for pivotally connecting the implement-mounting linkage of the present invention to the wheeled implement or cart 10 will now briefly be discussed. Mounted on the implement 10, disposed generally rearwardly thereof, is a pair of parallel-spaced triangular-shaped mounting plates 56, respectively mounted on the left- and right-rear corner portions of the farm implement 10. Each one of the respective left and right lower backside portions of the wheeled farm implement 10 has pivotally connected thereto an elongated linking member 58 (FIGS. 3 and 4). One linking member 58 is in the foreground and the other is in the background. Each linking member 58 is pivotally connected, at a first end portion 61 (FIGS. 1–4) thereof, to the farm implement 10 by a pivot pin 60. That is, the two pivot pins 60 (although only the one pin 60 in the foreground is shown) which pivotally connect linking members 58 to the above-mentioned left and right backside corner portions of implement 10 are essentially co-linear. Although not shown directly (because such detail is in the background in FIGS. 1–4) the manner in which the frame 12 is pivotally connected by the mechanism of the present invention to the left-rear mounting plate 56 is essentially as described herein for the foreground mounting plate 56 shown.

A so-called "stiffening" feature of the mechanism of the present invention will now briefly be discussed. As shown in plan view (FIG. 5), the foreground linking member 58 preferably includes an associated or second linking member 59. At pin 62, the members 58 and 59 are acutely angularly disposed, one to the other. Member 59 is pivotally connected to the backside of cart 10 by a pin (not shown) which is located between pins 60 and is co-linear therewith. The purpose of disposing linking members 58 and 59 angularly, as shown, is to minimize lateral movement of the frame 12 relative to the farm implement 10 when a lateral force is being imposed on the frame 12. The angled linking member 59 thereby functions as a stiffener, relative to the other linking member 58, thus allowing the mechanism of the present invention to be used to pivotally connect the frame 12 to the implement 10 whereby the operation of the mechanism is essentially unaffected by lateral forces being imposed thereon.

Returning now to FIGS. 3 and 5 to discuss further structure of the mechanism of the present invention, which structure pivotally connects the frame 12 to the wheeled implement 10, it is seen that the second or opposite end portion 63 of each linking member 58 is pivotally connected by a pivot pin 62 between the link-mounting plates 24 and 25. The linking members 58 and 59 of the foreground assembly, furthermore, are pivotally connected to the plates 24 and 25 in an alternating fashion (as shown in FIG. 5).

Also, on wheeled implement 10, respectively pivotally connected to each left-end and right-end mounting plate 56 mounted thereon, is an associated upper linking member 64, spaced from the respective one of the pair of lower linking members 58. Upper linking member 64 is non-parallel spaced from its respective lower linking member 58, for each of the static and dynamic cases discussed hereinbelow. Briefly, a first end portion 65 of each respective one of the foreground mounted (shown) and background mounted (not shown) upper linking members 64 is pinned by a pivot pin 66, to its respective associated mounting plate 56. The second or opposite end portion 67 (FIGS. 3 and 4) of each respective one of the foreground and background upper linking members 64 is sandwiched between the link-mounting plates 24 and 25, is spaced above pin 62, and is pivotally connected to link-mounting plates 24 and 25 by a pivot pin 68. As mentioned above, pivot pin 68 is spaced relatively higher above the ground than pivot pin 62, by a portion of the height of the link-mounting plates 24 and 25. Also, pivot pin 66 (on each mounting plate 56) is spaced relatively higher above the ground than each respective associated pivot pin 60 (mounted on the backside of implement 10); and each respective upper pivot pin 66 is spaced relatively radially further from the center C of the implement wheel 14 than its associated lower pivot pin 60.

That feature of the present invention, which results in the lower links 58 being non-parallel spaced from their respective associated upper links 64, will now briefly be discussed with reference to FIGS. 2-4. The pivot pins 60 and 62 define an axis A—A for each respective one of the above-discussed pairs of lower links 58. Similarly, the pins 66 and 68 define an axis B-B for each respective one of the foreground mounted (shown) and background mounted (not shown) upper links 64. The pivot pins 60, 62, 66 and 68 are relatively spaced, and mounted on the above-described structure, so that the axes A—A and B—B intersect rearwardly of the disc-opener and press-wheel assembly 30 when the frame 12 is lowered to the working position (FIG. 2). That is, the foreground axes A—A and B—B and the background axes A—A and B—B (not shown) intersect at respective foreground and background points rearwardly of the implement 10. Those points of intersection define a line of intersection $L_X$ (FIG. 2), located behind the implement 10 and its associated disc-opener and press-wheel assembly 30. The line of intersection $L_X$ of these foreground and background intersection points is disposed substantially parallel to the frame 12. On the other hand, when the frame 12 is raised to the transport position (FIG. 3), the axes A—A and B—B intersect substantially at the farm-implement axle along the centers C of the wheels 14.

In the below-presented discussion, motion of the frame 12 and its associated structure along the ground G is referred to as the "dynamic" case. The term "static" case refers to when the wheeled implement 10 and associated frame 12 are not in motion relative to the ground G. With the frame 12 in the working position (FIG. 4) and when the wheeled implement 10 is moved horizontally across the ground G, resistive forces imposed by the ground G upon each disc 32 cause the upper links 64, of the mechanism of the present invention, to be in compression and further cause the lower links 58 to be in tension, for the dynamic case. Because the axes A—A and B—B are non-parallel in the dynamic case, as is shown in FIG. 4 by angle "alpha", the net effect of the non-parallel relationship of the upper linking members 64 relative to the lower linking members 58 is to result in an imposition of a net downward force upon the frame 12 and its associated ground-tool implements, mounted thereon, in the dynamic case. That is, in the dynamic case, the forces attendant to the horizontal movement of the wheeled implement 10 relative to the ground G gives rise to a net downward force being imposed upon the assembly 30. In particular, this net downward force has the effect of causing the discs 32 to be forced into the ground G. Such a result is achieved because the upper links 64 are disposed at a relatively greater angle above the horizontal than are the lower links 58. That is, after performing structural analysis for links 64 and links 58 (and 59 of the foreground assembly), in the dynamic case, the respective compressive and tensile forces in the foreground and background upper linking members 64 and in the foreground and background lower linking members 58 result in a net downward force being imposed, by the implement-mounting linkage assembly of the present invention, upon the discs 32. Stating this another way, members 64 are in compression, and members 58 (and 59) are in tension. In the conventional four-point-hitch parallel-linkage design mentioned above, the compressive and tensile forces in the linking members of the conventional design tend to cancel, and thus have no net effect upon assemblies 30, because the conventional linking members are spaced parallel. In the instant invention, however, because the upper linking members 64 are angularly disposed relatively greater above the horizontal than their respective associated lower linking members 58, the downwardly-disposed force component imposed by upper linking members 64 has an absolute value greater than the upwardly-disposed force component imposed by lower linking members 58. The net force thus is downward, and is imposed upon the assemblies 30, in particular the disc-openers 32, for assisting in engagement with the soil for the above-discussed soil-working purposes. Thus, a downward force is imposed by the present invention upon the ground tool implement in the dynamic case. One clear advantage of such a result is that additional downward force on discs 32 is achieved without any weight being added to wheeled implement 10 or frame 12.

However, by design, a different result is achieved, when using the mechanism of the present invention in the static case. The so-called "static case" is that case where the wheeled implement 10 is not moved relative to the ground G. Because the disc-and-wheel assemblies 30 mounted to the secondary tool bar 28 can impose a significant overhung load upon frame 12 and/or wheeled implement 10, conventional four-point-hitch parallel-linkage designs can result in a significant moment being imposed upon the axle of the farm implement 10 at the centers C of the wheels 14. That is, a conventional hitch design often results in negative hitch weight, discussed above, being experienced as a result of the moment imposed upon the implement wheels 14. The implement-mounting linkage mechanism of the present invention, however, results in essentially no moment being imposed upon the centers C of the wheels 14, or upon the axle of the farm implement 10, by the above-discussed overhung load because the axes A—A and B—B intersect essentially at the farm implement axle. That is, again by design, the pivot pins 60, 62, 66 and 68 have been relatively spaced, and mounted on the above-described structure, to achieve this result. Further, the implement-mounting linkage mechanism accommodates intersections of the respective foreground (shown) and background (not shown) axes A—A and B—B, which are not precisely centered on the axle. That is, intersections of these axes A—A and B—B, which are spaced a relatively minor distance rearwardly of the axle, or which are spaced a relatively minor distance forward of the axle relative to the distance between the overhung load and the axle, will result in the imposition of respective relatively minor counterclockwise and clockwise moments about the axle. In other words, use of conventional machining procedures to fabricate the above-described structure of the herein-disclosed implement-mounting linkage mechanism of the present invention will of course give rise to structure which is not precisely dimensioned. Conventional tolerances have not been observed to affect the protypes fabricated according to the principles of the present invention, however. Rather, it has been observed that such tolerances, which result in the above-mentioned relatively minor spacings from the axle, do not affect the results achieved by the invention. That is, such tolerances are readily calculated, and depending upon the load carried by the farm implement 10, the load imposed upon frame 12 by the disc-and-wheel assemblies 30, the nature of the soil, etc., the above-described mechanism of the present invention can readily be fabricated to function as herein described. It has been observed, further, that spacings from the axle by as much as 4 to 6 inches do not appear to impose a noticeable moment about the axle of wheels 14. That is, neither a counterclockwise nor a clockwise rotation or rotational tendency was observed. In light of the above-mentioned tolerances and other variables or parameters, the spacing of the intersection points of the foreground (and background) axes A—A and B—B from the axle of wheels 14 becomes, in fact, a matter of design choice; and many of the choices will be readily apparent to those skilled in the art.

What has been illustrated and described herein is a novel implement-mounting linkage mechanism. While the implement-mounting linkage mechanism of the present invention has been illustrated and described with reference to a preferred embodiment, the present invention is not limited thereto. On the contrary, alternatives, changes or modifications, including structural alternatives and/or mechanical equivalents, may become apparent to those skilled in the art upon reading the foregoing description. Accordingly, such alternatives, changes and modifications are to be considered as forming a part of the invention insofar as they fall within the spirit and scope of the appended claims.

We claim:

1. A farm implement supported by transversely spaced wheels, said implement having a frame pivotally connected thereto rearwardly thereof by a linkage mechanism, said frame having soil-engaging tools mounted thereon, wheel means mounted on said frame for raising and lowering said frame relative to the ground between transport and working positions, said linkage mechanism comprising: first-linking means connected at spaced opposite-end portions thereof by respective first and second pivot means pivotally linking the frame to the implement with a line interconnecting said respective first and second pivot means defining a first axis; second-linking means connected at spaced opposite-end portions thereof by respective first and second pivot means pivotally linking the frame to the implement with a line intersecting said last mentioned respective first and second pivot means defining a second axis; the axes of said first-linking means and second-linking means intersecting substantially at the axis of the transversely spaced wheels of the implement when the frame is in its transport position; and the axes of said first-linking means and second-linking means intersecting rearwardly of the frame when the frame is in its working position to cause a downwardly-acting force to be imposed upon the engaging tools for engaging the soil.

2. The mechanism of claim 1 further comprising means for resisting lateral movement of the frame relative to the wheeled implement when a lateral force is imposed on the frame.

3. A linkage mechanism as set forth in claim 1 in which the first- and second-linking means are connected at their adjacent ends in a spaced relationship to an upstanding portion of said implement.

4. A linkage mechanism as set forth in claim 3 in which the first- and second-linking means are disposed in a non-parallel relationship when the frame is located in its transport and working positions.

* * * * *